United States Patent
Kountanya et al.

(10) Patent No.: US 9,604,291 B2
(45) Date of Patent: Mar. 28, 2017

(54) BALL-END MILLING CUTTER TOOL

(71) Applicant: UNITED TECHNOLOGIES CORPORATION, Farmington, CT (US)

(72) Inventors: Raja Kountanya, Manchester, CT (US); Changsheng Guo, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 175 days.

(21) Appl. No.: 14/472,804

(22) Filed: Aug. 29, 2014

(65) Prior Publication Data
US 2015/0086283 A1    Mar. 26, 2015

Related U.S. Application Data

(60) Provisional application No. 61/881,490, filed on Sep. 24, 2013.

(51) Int. Cl.
*B23C 5/00* (2006.01)
*B23C 5/10* (2006.01)

(52) U.S. Cl.
CPC ........ *B23C 5/1009* (2013.01); *B23C 2215/44* (2013.01); *B23C 2265/08* (2013.01); *Y10T 407/1946* (2015.01)

(58) Field of Classification Search
CPC  B23C 5/02; B23C 5/10; B23C 5/1009; B23C 2215/44; B23C 2215/08
See application file for complete search history.

(56) References Cited

U.S. PATENT DOCUMENTS

| | | | |
|---|---|---|---|
| 1,499,818 A * | 7/1924 | Franconetti | B23C 5/12 29/10 |
| 3,286,557 A | 11/1966 | Rietzler et al. | |
| 4,032,251 A * | 6/1977 | Ribich | B23B 51/10 408/199 |
| 5,971,670 A * | 10/1999 | Pantzar | B23B 31/1107 407/119 |
| 6,149,354 A * | 11/2000 | Walters | B23C 5/10 29/10 |
| 8,142,119 B2 * | 3/2012 | Volokh | B23C 3/02 407/53 |
| 8,517,645 B2 * | 8/2013 | Harif | B23C 5/10 409/138 |
| 2004/0179904 A1 * | 9/2004 | Zhou | B23C 5/10 407/54 |
| 2005/0123364 A1 * | 6/2005 | Zhou | B23C 5/10 407/53 |
| 2005/0133277 A1 * | 6/2005 | Dixon | B23C 5/1009 175/426 |

(Continued)

FOREIGN PATENT DOCUMENTS

EP        1536906 A1    6/2005

*Primary Examiner* — Will Fridie, Jr.
(74) *Attorney, Agent, or Firm* — Cantor Colburn LLP

(57) ABSTRACT

A tool is disclosed that has an elongated tool body defining a longitudinal axis and includes a ball-end section having a positive taper angle relative to the longitudinal axis of the tool body, and a relief section that extends rearwardly from the ball-end section and has a negative taper angle relative to the positive taper angle of the ball-end section.

13 Claims, 4 Drawing Sheets

(56) References Cited

U.S. PATENT DOCUMENTS

| | | | |
|---|---|---|---|
| 2008/0101877 A1* | 5/2008 | Engin | B23C 3/18 407/30 |
| 2011/0200964 A1* | 8/2011 | Matsutani | A61C 3/02 433/165 |
| 2011/0211922 A1* | 9/2011 | Maeda | B23C 5/1009 407/54 |
| 2012/0170985 A1* | 7/2012 | Hill | B23C 5/10 407/62 |
| 2013/0051939 A1 | 2/2013 | Wu | |
| 2015/0025559 A1* | 1/2015 | Kulas | B23C 5/1009 606/180 |
| 2015/0086283 A1* | 3/2015 | Kountanya | B23C 5/1009 407/53 |
| 2015/0173776 A1* | 6/2015 | Burke | A61B 17/1615 606/80 |

* cited by examiner

BALL-END MILLING CUTTER TOOL

CROSS-REFERENCE TO RELATED APPLICATION

This application claims the benefit of priority under 35 U.S.C. §119(e) to U.S. Provisional Application No. 61/881,490, filed Sep. 24, 2013, which is incorporated herein by reference in its entirety.

BACKGROUND OF THE INVENTION

1. Field of the Invention

The subject invention relates generally to tools for machining complex part configurations, and more particularly, to a ball-end milling cutter tool for multi-axis milling or super abrasive machining of complex surfaces such as airfoils for gas turbine rotor blades and vanes.

2. Description of Related Art

In aerospace manufacturing, it is customary to use a ball-end milling tools to produce machined surfaces. The tapered ball-end milling tool has been the standard in the industry, since it offers flexibility on the range of axial step-over which the milling tool can achieve during stripe milling processes on most machine parts.

However, this standard tool design often limits the step-over range for some surface designs such as twisted airfoils or other complex surfaces present on gas turbine rotor blades and vanes. This results in lower material removal rates, longer cycle times, lower productivity and higher machining costs. In addition, the standard ball-end milling tool can cause rubbing or gouging when machining large airfoils with a relatively severe twist, such as those employed in the compressor section of the Pratt & Whitney PW1000G Geared Turbofan (GTF) engine.

It would be beneficial therefore, to provide a ball-end milling tool configured in such a manner so as to provide greater step-over range on airfoil surfaces with relatively severe twist, and to reduce or otherwise eliminate the rubbing and gouging problems associated with using a standard ball-end milling tool to machine such highly complex surfaces.

SUMMARY OF THE INVENTION

The subject invention is directed to a new and useful tool for multi-axis milling or super abrasive machining of complex surfaces such as airfoils for gas turbine rotor blades and vanes. The tool of the subject invention has an elongated tool body defining a longitudinal axis and including a ball-end section that has a positive taper angle relative to the longitudinal axis of the tool body.

The tool body further includes a relief section that extends rearwardly from the ball-end section and has a negative taper angle, relative to the positive taper angle of the ball-end section. The tool body further includes a shank section that extends rearwardly from the relief section.

The shank section of the tool body has a positive taper angle. Preferably, the positive taper angle of the shank section is less than the positive taper angle of the ball-end section. In an exemplary embodiment of the subject invention, the taper angle of the ball end-section of the tool body is about 30 degrees.

The ball-end section of the tool body has a plurality of cutting flutes formed therein. In an exemplary embodiment of the subject invention, the ball-end section of the tool body may have four cutting flutes formed therein. Also, in an exemplary embodiment of the subject invention, the cutting flutes are co-extensive with the ball-end section of the tool body. However, this is not a requirement of the subject invention.

The subject invention is also directed to a new and useful tool that has an elongated tool body defining a longitudinal axis and including a radially outwardly tapering ball-end section, and a radially inwardly tapering relief section extending rearwardly from the radially outwardly tapering ball-end section.

The tool body further includes a radially outwardly tapering shank section extending rearwardly from the radially inwardly tapering relief section. Preferably, the taper angle of the radially outwardly tapering shank section is less than the taper angle of the radially outwardly tapering ball-end section.

The subject invention is also directed to a new and useful milling tool that includes a conically expanding distal portion having a positive taper angle, a conically reducing medial portion having a negative taper angle, and a conically expanding proximal portion having a positive taper angle, wherein the conically expanding distal portion of the milling tool is a ball-end section that has a plurality of spaced apart cutting flutes formed therein.

These and other features of the milling tool of the subject invention and the manner in which it is constructed and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art will readily understand how to make and use the subject invention without undue experimentation, embodiments thereof will be described in detail herein below with reference to certain figures, wherein.

DETAILED DESCRIPTION OF PREFERRED EMBODIMENTS

Figure 1:
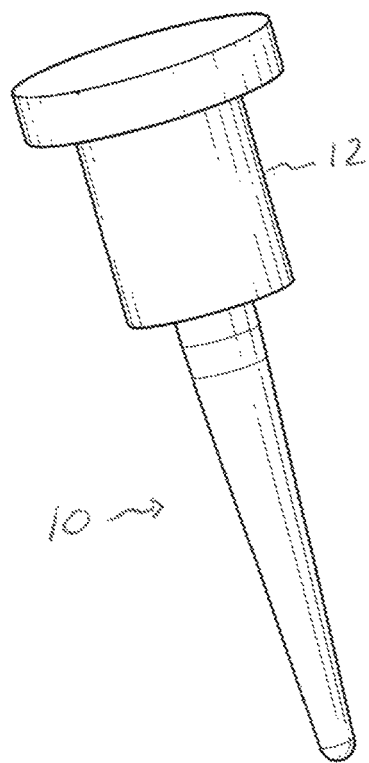
FIG. 1 is a rendering of a prior art ball-end milling cutter tool supported within a tool holder.

Referring now to the drawings, there is illustrated in FIG. 1 a standard prior art ball-end milling cutter tool designated generally by reference numeral 10, which is supported within a tool holder 12. The tool holder 12 is typically associated with a multi-axis milling machine that is capable of performing spot or stripe milling procedures commonly employed when fabricating complex machine parts such as gas turbine rotor blades and vanes.

The tapered ball-end milling tool 10 is known, as it offers flexibility on the range of axial step-over which the tool can achieve during stripe milling processes. However, as explained in more detail below, such ball-end milling tool 10 is less adequate for use in stripe milling procedures employed on airfoil surfaces that have a relatively sever twist, because it can rub against the airfoil surface and cause gouging, which may detrimentally affects the surface finish of the airfoil.

Figure 2:
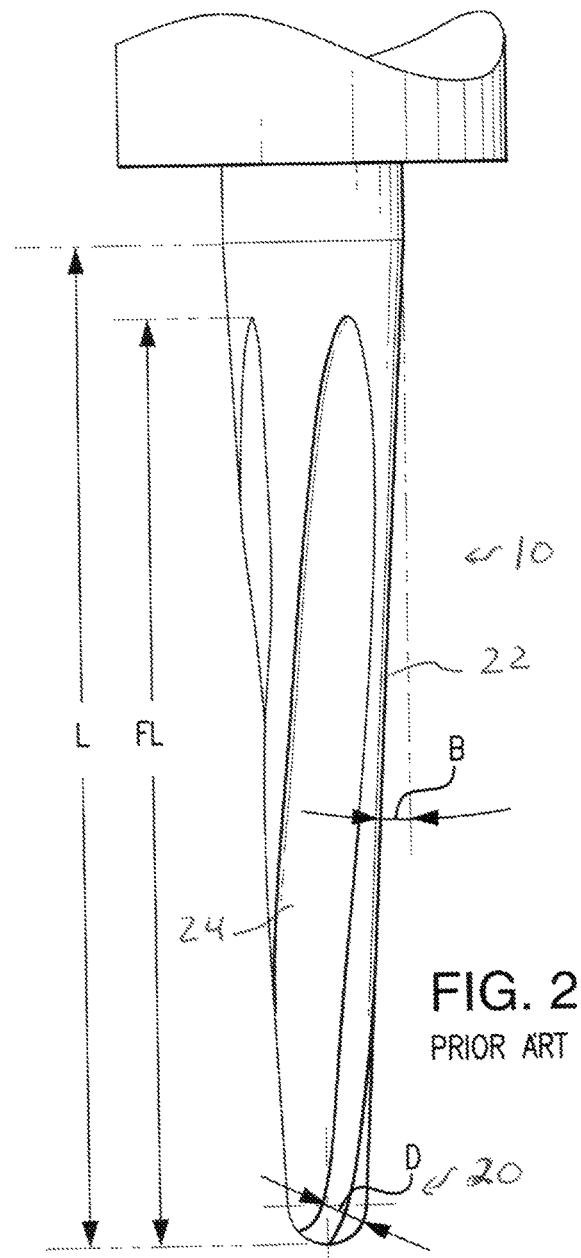
FIG. 2 is an enlarged elevational view of the prior art ball-end milling cutter tool shown in FIG. 1, with dimensional lines corresponding to certain features of the tool body.

Referring to FIG. 2, the known tapered ball-end milling tool 10 includes a ball-end section 20. The ball-end section 20 of tool 10 has a ball diameter D. The tool 10 further includes a tapered shaft section 22. The tapered shaft section 22 of tool 10 has a length L and a taper angle B.

The tapered shaft section 22 of tool 10 has a plurality of spaced apart cutting flutes 24 formed therein. For example, the tapered shaft section 22 of tool 10 may have four or more spaced apart cutting flutes 24. The cutting flutes 24 in shaft section 22 are characterized by a flute length FL. In this known tool design, the length L of the tapered shaft section 22 is greater than the flute length FL of the spaced apart cutting flutes 24.

By way of example, for the known ball-end milling tool 10, the ball diameter D of the ball-end section 20 is 0.50 inches, the taper angle B of the tapered shaft section 22 is 3.0 degrees, the length of the tapered shaft section is 6.50 inches and the flute length FL of the flutes 24 is 6.00 inches.

Figure 3:
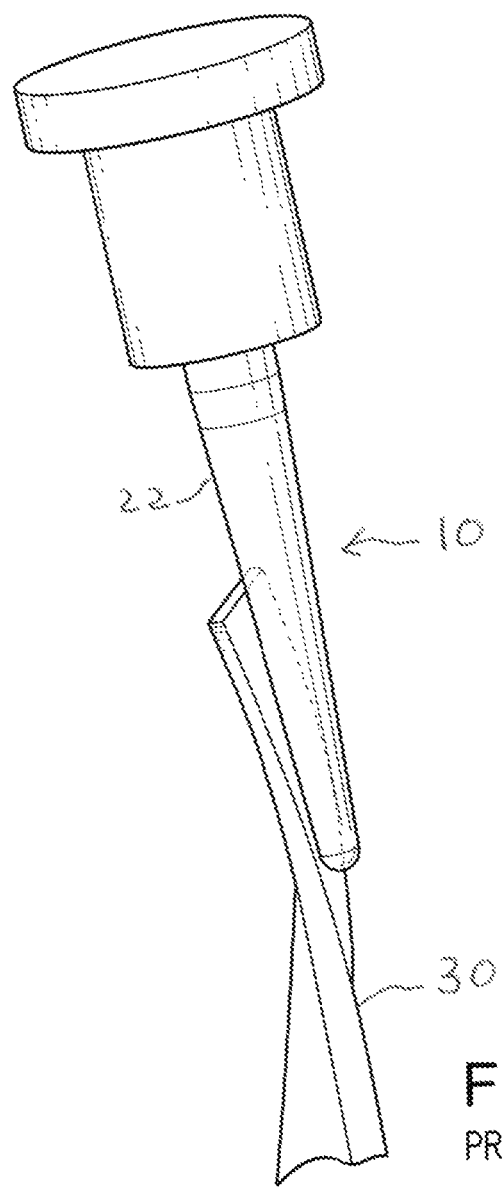
FIG. 3 is an illustration of the prior art ball-end milling cutter tool during a milling operation performed on an airfoil having a relatively severe twist.

Referring to FIG. 3, there is illustrated the prior art ball-end milling tool 10 during the performance of a strip milling procedure on an airfoil 30 having a severe twist. Those skilled in the art will readily appreciate that the inclination of the tool 10 and the proximity of the tapered shaft section 22 relative to the twisted airfoil 30, can result in rubbing and gouging, which have a detrimental effect on the surface finish of the airfoil 30.

For the known tool design, a larger taper angle will reduce the possibility of rubbing the airfoil being machined but increase the possibility of rubbing adjacent airfoils.

Figure 4:
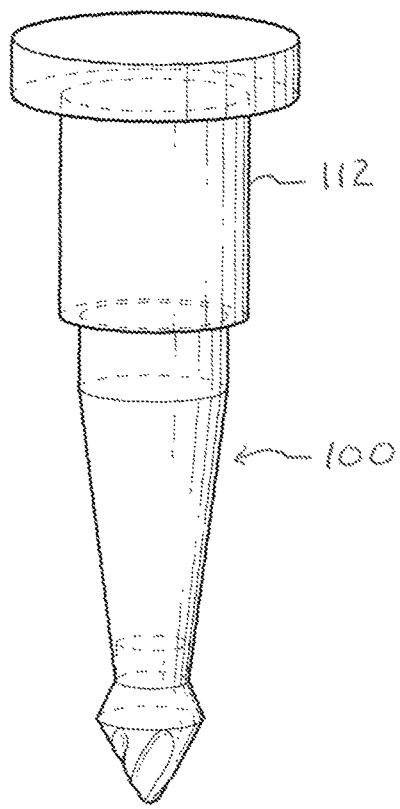
FIG. 4 is a rendering of a ball-end milling cutter tool constructed in accordance with the subject invention supported within a tool holder.

Turning now to FIG. 4, there is illustrated a new and useful ball-end milling tool configured in accordance with a disclosed embodiment, and designated generally by reference numeral 100. The tool 100 is supported within a tool holder 112, which is typically associated with a multi-axis milling machine capable of performing stripe milling procedures commonly employed when fabricating complex machine parts such as gas turbine rotor blades and vanes.

As explained in more detail below, the ball-end milling tool 100 is advantageously configured for use in stripe milling procedures or abrasive machining on airfoil surfaces that have a relatively severe twist. The geometry of the ball-end milling tool 100 is such that it will readily enable stripe milling of complex airfoil surface without rubbing or gouging the surface of the airfoil.

Figure 5:
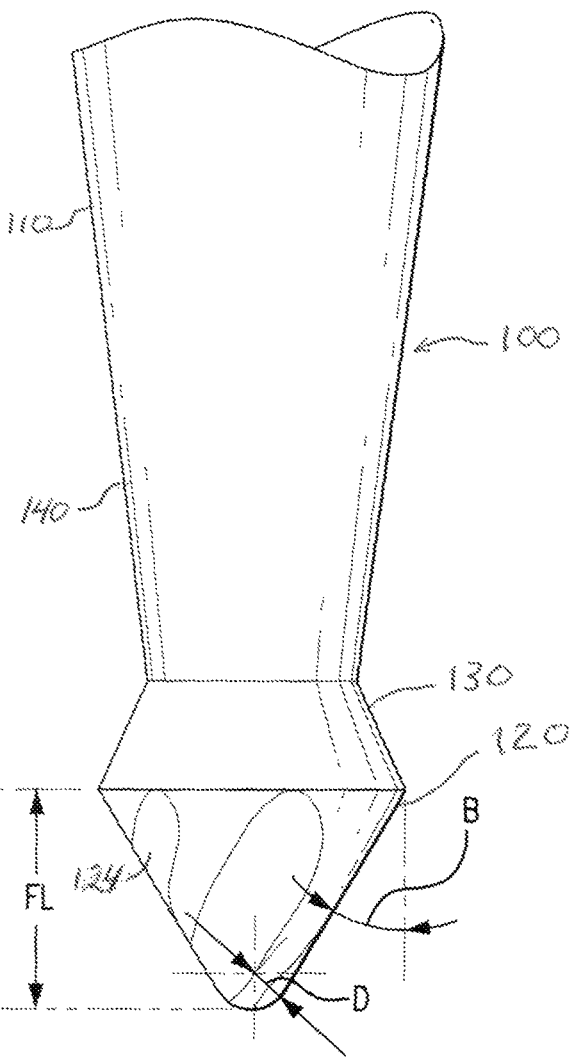
FIG. 5 is an enlarged elevational view of the ball-end milling cutter tool shown in FIG. 4, with dimensional lines corresponding to certain features of the tool body.

Referring to FIG. 5, tool 100 has an elongated tool body 110 defining a longitudinal axis X and including a ball-end section 120 that defines the distal cutting head of the tool. The ball-end section 120 of tool body 110 has a ball diameter D. Furthermore, the ball-end section 120 of tool body 110 is further characterized by a positive taper angle B relative to the longitudinal axis X of the tool body 110. That is, the ball-end section 120 of tool body 110 has a conically expanding, radially outwardly tapered profile as it extends in a proximal direction along the longitudinal axis X of the tool body 110.

The tool body 110 further includes a relief section 130 that extends rearwardly from the ball-end section 120, so that the two sections share a common vertex. The relief section 130 of tool body 110 has a negative taper angle, relative to the positive taper angle B of the ball-end section 120. In other words, the relief section 130 of the tool body 110 has a conically reducing, radially inwardly tapered profile relative to the conically expanding, radially outwardly tapered profile of the ball-end section 120 of the tool body 110, as it extends in a proximal direction along the longitudinal axis X of the tool body 110. The taper angle of the ball-end section 120 and the relief section 130 are substantially similar.

Those skilled in the art will readily appreciate that the negative taper angle of the relief section 130 serves to dimensionally relieve the increased tool diameter presented by the positively tapered ball-end section 120 of tool body 110.

The tool body 110 further includes a shank section 140 that extends rearwardly from the relief section 130, so that the two sections share a common vertex. The shank section 140 of the tool body 110 has a positive taper angle, or keeps the same diameter if the tool is strong enough for the cutting load. That is, the shank section 140 of the tool body 110 has a conically expanding, radially outwardly tapered profile relative to the radially inwardly tapered profile of the relief section 130 of tool body 110, as it extends in a proximal direction along the longitudinal axis X of the tool body 110.

Preferably, the shank section 140 has a less acute expansion angle than the ball-end section 120. That is, the positive taper angle of the shank section 140 is less than the positive taper angle B of the ball-end section 120. This provides the benefit of keeping the shank section 140 away from the work piece during a cutting operation, as explained in more detail below with respect to FIG. 6. In an exemplary embodiment of the subject invention, the taper angle of the ball end-section 120 of the tool body 110 is about 30 degrees.

The ball-end section 120 of the tool body 110 has a plurality of spaced apart cutting flutes 124 formed therein. In an exemplary embodiment, the ball-end section 120 of the tool body 110 has four spaced apart cutting flutes 124 formed therein. The cutting flutes 124 have a flute length FL that is co-extensive with or otherwise extend along the axial span of the ball-end section 120 so that they are substantially equal to the length L of the ball-end section 120 of the tool body 110. However, axially shorter cutting flutes can be provided. Indeed, it is envisioned and well within the scope of the subject disclosure that the flute length FL of the spaced apart cutting flutes 124 can be less than the length L of the ball-end section 120.

By way of a non-limiting example, for the ball-end milling tool 100 of the subject invention, the ball diameter D of the ball-end section 120 is about 0.50 inches, the length L of the positively tapered ball-end section 120 is about 6.00 inches and the flute length FL of the spaced part cutting flutes 124 is also about 6.00 inches.

As indicated, the geometry of the ball-end milling tool 100 provides a much stiffer mechanical construct than the geometry of the prior art tapered ball-end milling tool 10 shown in FIG. 1. Thus, the ball-end milling tool 100 can be subjected to greater loading and stress than the prior art milling tool 10.

Figure 6:
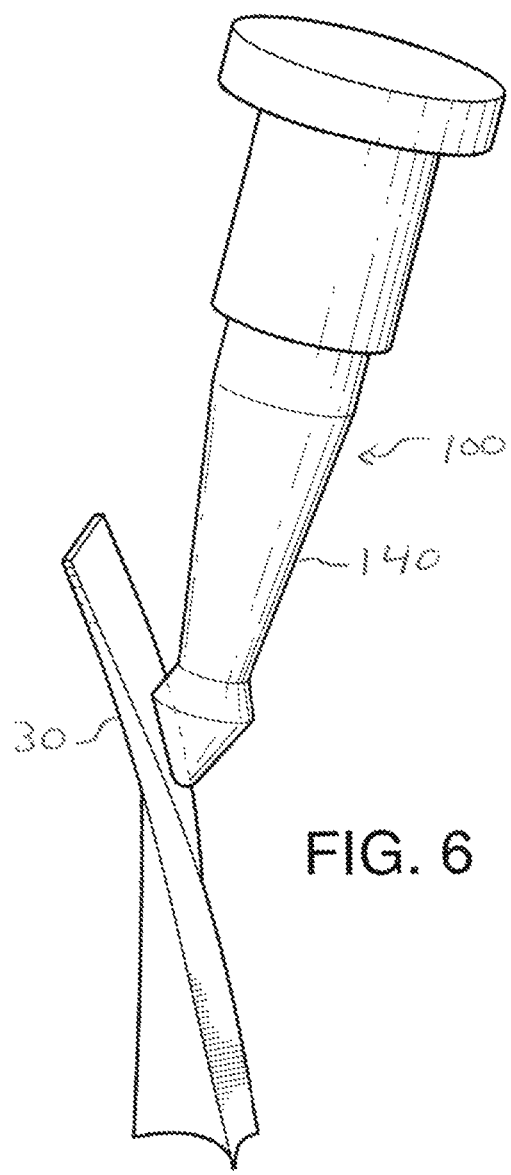
FIG. 6 is an illustration of the ball-end milling cutter tool of the subject invention during a milling operation performed on an airfoil having a relatively severe twist.

As indicated, and as illustrated in FIG. 6, the relatively smaller taper angle presented by the shank section 140 makes it possible to design a milling cutter tool that can avoid rubbing and gouging the surface of a large airfoil 30 having a relatively severe twist. The ball-end milling tool 100 provides a larger step-over distance for a stripe milling procedure than the illustrated prior art. This provides higher material removal rates, lower cycle times and reduced machining costs, as compared to those achieved with the prior art ball-end milling tool shown in FIG. 1.

Better surface finishes can also be achieved, as compared to those achieved with the prior art ball-end milling tool shown in FIG. 1. Furthermore, the geometry of the ball-end milling tool 100 provides a greater range of tool inclination than the prior art ball-end milling tool 10, allowing for a higher flexibility in the approach angle of the milling cutter to the surface.

It is envisioned that the end-ball milling cutter tool 100 can be used to manufacture original engine components or to repair or refurbish used or damaged engine components, as well as other parts or components having complex surface geometries.

Those skilled in the art will readily appreciate that the milling cutter tool of the subject invention could be manufactured using a variety of conventional fabrication techniques and materials. For example, the tool could be turned or ground from a steel or carbide blank. Alternatively, the tool could be formed by sintering PCD (polycrystalline diamond or PCBN (polycrystalline cubic boron nitride) on a steel or carbide shaft that is subsequently dress formed into a ball-end milling cutter tool constructed in accordance with the subject invention. The new cutter shape design can also be used for blanks for Super Abrasive Machining (SAM) tools such as electroplated Cubic Boron Nitride (CBN) wheels or vitrified bond CBN wheels.

While the milling tool of the subject invention has been shown and described with reference to a preferred embodiment, those skilled in the art will readily appreciate that various changes and/or modifications may be made thereto without departing from the spirit and scope of the subject invention as defined by the appended claims.

What is claimed is:

1. A tool comprising:
    an elongated tool body defining a longitudinal axis and including a ball-end section having a first positive taper angle relative to the longitudinal axis of the tool body;
    a relief section extending rearwardly from the ball-end section and having a negative taper angle relative to the positive taper angle of the ball-end section;
    a shank section extending rearwardly from the relief section, the shank section and relief section sharing a common vertex, wherein the shank section has a conically expanding, radially outward second positive taper angle that is a less acute expansion angle than the first taper angle; and
    a plurality of spaced apart cutting flutes solely formed within the ball-end section of the tool body.

2. A tool as recited in claim 1, wherein the ball-end section of the tool body has four spaced apart cutting flutes formed therein.

3. A tool as recited in claim 1, wherein the cutting flutes are co-extensive with the ball-end section of the tool body.

4. A tool as recited in claim 1, wherein the taper angle of the ball end-section of the tool body is about 30 degrees.

5. A tool comprising:
    an elongated tool body defining a longitudinal axis and including a radially outwardly tapering ball-end section, the tapering of the ball-end section being at a first taper angle;
    a radially inwardly tapering relief section extending rearwardly from the ball-end section;
    a conically expanding, radially outwardly tapering shank section extending rearwardly from the radially inwardly tapering relief section, the tapering of the shank section being at a second taper angle, the shank section and relief section sharing a common vertex;
    the second taper angle being a less acute expansion angle than the first taper angle; and
    a plurality of spaced apart cutting flutes solely formed within the ball-end section of the tool body.

6. A tool as recited in claim 5, wherein the taper angle of the ball end-section of the tool body is about 30 degrees.

7. A tool as recited in claim 5, wherein the ball-end section of the tool body has a plurality of spaced apart cutting flutes formed therein.

8. A tool as recited in claim 7, wherein the ball-end section of the tool body has four spaced apart cutting flutes formed therein.

9. A tool as recited in claim 7, wherein the cutting flutes are co-extensive with the ball-end section of the tool body.

10. A tool comprising:
    a) a first portion, which is a conically expanding distal portion, having a first positive taper angle;
    b) a second portion, which is a conically reducing medial portion, having a negative taper angle;
    c) a third portion, which is a conically expanding proximal portion, having a radially outward second positive taper angle that is a less acute expansion angle than the first taper angle, the second portion and third portion sharing a common vertex; and
    d) wherein the conically expanding distal portion of the tool is a ball-end section having a plurality of spaced apart cutting flutes solely formed therein.

11. A tool as recited in claim 10, wherein the ball-end section has four spaced apart cutting flutes formed therein.

12. A tool as recited in claim 11, wherein the cutting flutes are co-extensive with the ball-end section.

13. A tool as recited in claim 10, wherein the taper angle of the ball end-section is about 30 degrees.

* * * * *